United States Patent Office 3,432,276
Patented Mar. 11, 1969

---

3,432,276
NEPTUNIUM RECOVERY PROCESS
William H. Reas, Monte Sereno, Calif., assignor to General Electric Company, a corporation of New York
Filed Nov. 17, 1966, Ser. No. 595,181
U.S. Cl. 23—338          8 Claims
Int. Cl. G21c *19/46*

ABSTRACT OF THE DISCLOSURE

This invention relates to a process for reprocessing irradiated fuel from chain nuclear fission reactors, and in particular discloses an improved chemical process for separating neptunium from plutonium (even in the presence of uranium) in solutions of such materials formed by dissolution of such reactor fuel. In this process the bulk of the fission products formed by irradiation of the fuel are first separated as a mixture from the uranium and transuranics such as neptunium and plutonium by extraction with an organic solvent, and the plutonium and the neptunium are separated in sequence. This involves a unique procedure for plutonium and neptunium valence control which permits their efficient separation from one another.

DISCLOSURE

Figure 1:
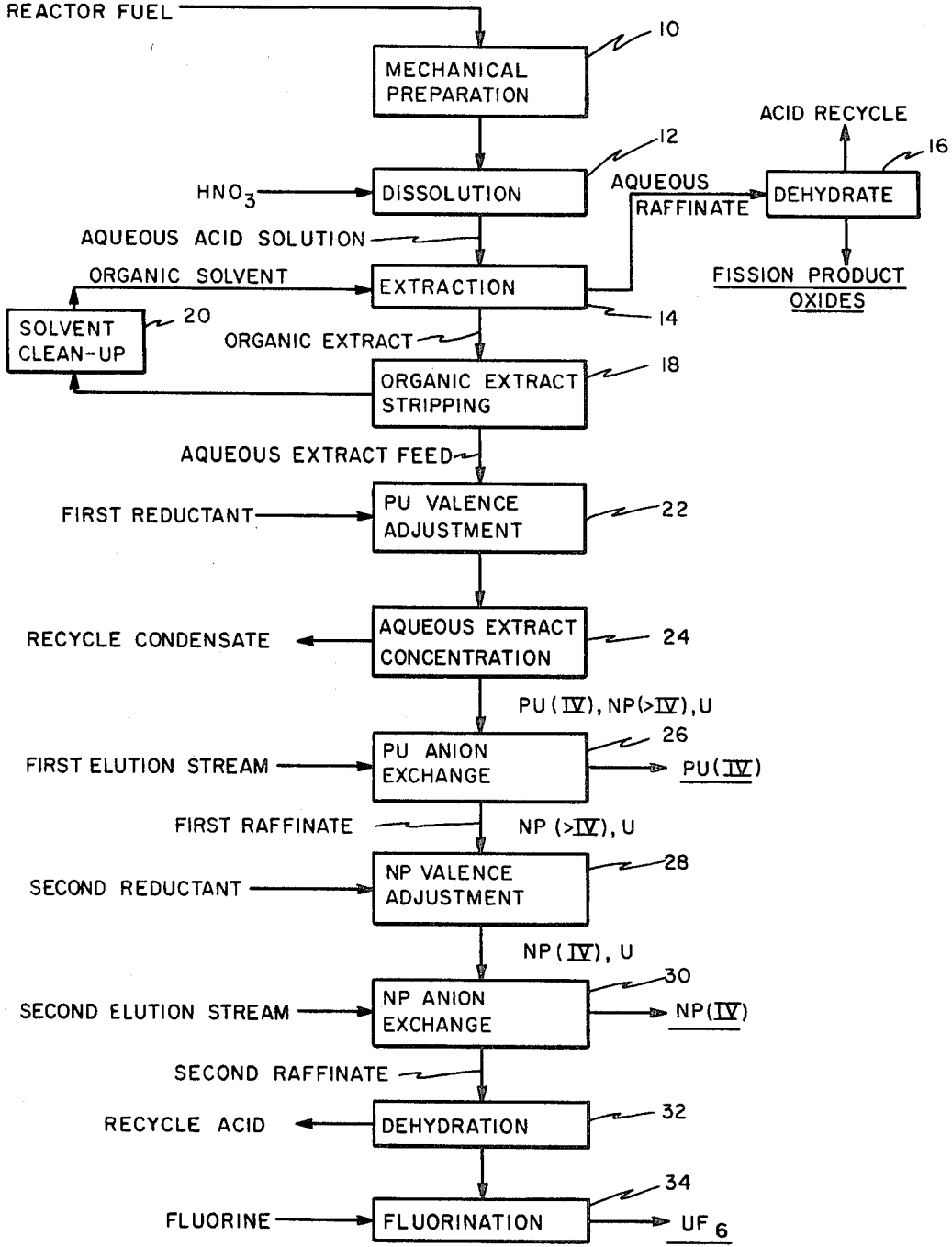

Nuclear chain fission reactions and the reactors in which such reactions are accomplished are now well known. In general, a nuclear reactor is made up of a chain reacting assembly including nuclear fuel material contained in fuel elements having various geometric shapes such as plates, tubes, or rods. These fuel elements are usually provided with a corrosion resistant nonreactive heat conductive layer or clad on their external surfaces. In power reactors, these elements are usually grouped together at fixed distances from one another in a coolant flow channel or region forming what is termed a fuel assembly. A sufficiently large number of such assemblies are combined together in the chain reacting assembly or core to permit a controllable self-sustained nuclear fission chain reaction. The reactor core is enclosed within a container through which the reactor coolant is circulated. In thermal neutron spectrum reactors, a neutron moderator is also provided and in some cases this moderator may also perform as the reactor coolant. The known boiling water and pressurized water reactors are examples of such thermal reactors.

The nuclear fuel material contains fissionable atoms such as U-233, U-235, Pu-239, or Pu-241. This material may be in elemental or compound form. Upon absorption of a neutron by the nucleus of such a fissionable atom, a nuclear disintegration frequently results. This produces on the average two fission product atoms of lower atomic weight and of great kinetic energy. Also released in such a disintegration are several neutrons of high energy. For example, in the fission of U-235 atoms, light fission product atoms of mass number ranging between 80 and 110 and heavy fission product atoms of mass number ranging between 125 and 155 are produced. On the average, 2.5 neutrons per fission event are released. The total energy released approaches 200 mev. (million electron volts) per fission.

The kinetic energy of the fission product atoms as well as that of the fission neutrons is quickly dissipated producing heat in the fuel elements of the reactor. Some additional heat is generated directly in the reactor structural materials, in the coolant, and any moderator present, due to radiation effects. If there is one net neutron remaining on the average from each fission event and this neutron induces a subsequent fission event, the fission reaction becomes self-sustaining and is thus called a chain reaction. Heat generation may be maintained and the heat is removed by passing a coolant fluid through heat exchange relationship with the fuel elements. The fissionable atoms are thus gradually consumed. Some of the fission product atoms produced are strong neutron absorbers (fission product poisons). Thus the fission reaction tends to decrease and cannot be maintained indefinitely at a given level.

In some nuclear reactor fuel elements, fertile atoms such as U-238 may be included in addition to the above noted fissionable atoms. A fairly common currently used nuclear power reactor fuel material consists of enriched uranium dioxide ($UO_2$) in which approximately 2.0% of the uranium atoms are U-235 which are fissionable by thermal neutrons, while the remaining 98% is U-238 which is not so fissionable to any significant degree. In the course of operating a reactor fueled with such fissionable and fertile atoms, the fissionable atoms (U-235) originally present are gradually consumed and simultaneously neutron irradiation of the fertile atoms (U-238) converts a part of them into fissionable atoms (Pu-239). Initially, the concentration of these newly created fissionable atoms gradually rises with irradiation and then approaches an equilibrium value. These atoms are fissionable by thermal neutrons and thus contribute to the maintenance of the chain fission reaction so that the reaction may be continued longer than would have been the case if only the original charge of fissionable atoms was available.

Since the rate at which fissionable atoms are created by fertile atom conversion is (except in the breeder-converter type of reactor of special design) always less than the rate at which the original fissionable atom charge is consumed during operation, the reactor can maintain this heat generation at a given power level for only a finite length of time. Ultimately the maximum power level at which the reactor can be operated must be decreased and finally the reactor must be shut down for refueling. Some or all of the irradiated fuel assemblies are removed and replaced with new fuel assemblies having a higher concentration of fissionable atoms and no fission product poisons. Th reactivity of the refueled reactor core is higher and the original power level can thus be restored.

The irradiated reactor fuel removed from the reactor ordinarily contains a valuable unconsumed quantity of the original fissionable material (the fissionable atoms) and a significant quantity of fissionable material converted from any fertile material (the fertile atoms) which may have been a component of the original fuel. Irradiated fuel also may contain fission products (the fission product atoms) or transuranic isotopes (or both) which are of substantial value. One such transuranic is the neptunium isotope Np-237, which is formed from neutron irradiation of U-235 and U-238 in accordance with the following reactions:

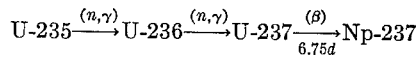

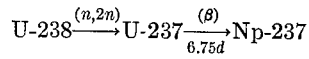

While Np-237 may have other uses, one current use is in the production of Pu-238 by further neutron irradiation in accordance with the following reaction:

$$\text{Np-237} \xrightarrow{(n,\gamma)} \text{Np-238} \xrightarrow[2.10d]{(\beta)} \text{Pu-238}$$

Pu-238 is a long lived (89 year half-life) energetic alpha particle emitter, the radioactive decay of which yields thermal energy at rates sufficient to power direct thermal-to-electrical energy conversion devices.

Accordingly, it is highly desirable to reprocess the irradiated fuel to recover and separate the fissionable and fertile materials for reuse, and to recover transuranic isotopes such as Np-237 for use in production of Pu-238 or otherwise.

One particularly advantageous irradiated fuel reprocessing system is described and claimed in U.S. Patent No. 3,222,124 issued Dec. 7, 1965 to H. W. Alter and C. R. Anderson. In this process, an acid solution of the irradiated fuel is contacted with an anion exchange resin to separate plutonium from the uranium and fission products, the plutonium is recovered from the resin and subsequently purified, the uranium-fission product fraction is dehydrated and calcined to the oxide form, the mixed oxides are fluorinated, and the volatile uranium hexafluoride is separated from fission product fluorides.

The present invention is directed to an improvement of the process of U.S. Patent No. 3,222,124 which permits the separation and recovery of neptunium (including Np-237), the uranium and the plutonium.

It is therefore a primary object of the present invention to provide a simplified chemical reprocessing procedure for the recovery of neptunium, plutonium and uranium from irradiated nuclear reactor fuel at high decontamination factors in a minimum number of processing steps.

Other objects and advantages of this invention will become apparent to those skilled in this art as the description and illustration of the invention proceed.

Figure 2:
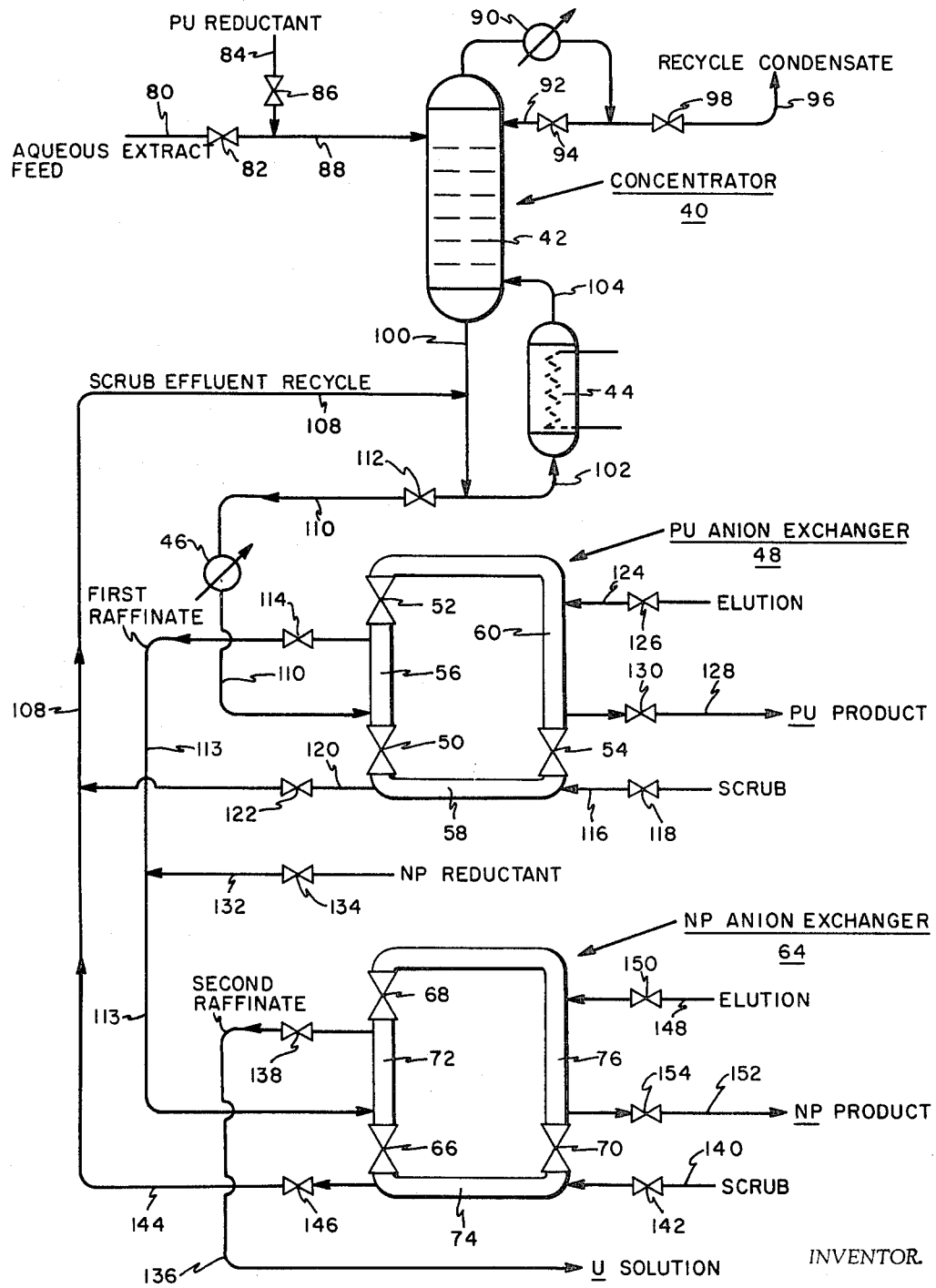

The present invention will be more readily understood by reference to the following detailed description which includes references to the accompanying drawings in which:

FIGURE 1 is a simplified block diagram illustrating the basic principles of the process of the present invention; and FIGURE 2 is a simplified process flow diagram illustrating the steps of the process of this invention in which neptunium is separated from plutonium and uranium.

Referring now more particularly to FIGURE 1, irradiated nuclear reactor fuel is introduced to mechanical preparation step 10. Here the flow channels, lifting bales, nosepieces, and other non-fuel-containing removable parts of the fuel assembly are removed. If desired, mechanical disassembly of the fuel rod assembly such as by separating individual fuel rods may also be performed. In one preferred embodiment, the individual fuel rods are further chopped into short sections about three inches long. In another preferred embodiment of the invention, the entire full length fuel rods are passed through a rolling and punching mechanism which perforates the clad and crushes to a slight extent the fuel material contained within the fuel element. Either of these latter two operations are designed to increase the access of the dissolving acid to the fuel material.

The mechanically prepared fuel is introduced into fuel dissolution step 12. In this step the irradiated fuel is contacted with a strong mineral (such as nitric) acid to dissolve the fuel material, preferably leaving the clad metal (such as zirconium or stainless steel) substantially unaffected. This treatment produces an aqueous acid solution of the uranium and transuranic irradiation products such as plutonium and neptunium, and fission products which may be separated from undissolved clad material by decantation, filtration, or similar operations.

The aqueous acid solution is introduced into organic extraction step 14 where it is countercurrently contacted with an organic solvent. There are a number of known organic solvent extraction processes suitable for making this separation, including the Purex process using a paraffic hydrocarbon solution of tributyl phosphate as solvent, the redox process using dialkyl ethers as solvent, and others. The uranium and tansuranics such as plutonium and neptunium, concentrate in the organic extract phase and are thus separated from the fission products which are substantially all retained in the acidic aqueous raffinate phase.

The aqueous raffinate phase from step 14 may be subjected to further processing. For example, it may be introduced into dehydration step 16. Here the fission products are recovered in solid form for further processing or for disposal. In processes where the fuel has been dissolved in a volatile acid such as nitric acid, the aqueous raffinate may be heated to evaporate water and to recover a substantial part of the acid for reuse. The fission product solids remaining may be calcined to produce a substantially anhydrous fission product oxide stream.

The organic extract phase from step 14 is introduced into organic extract stripping step 18 where the extract is countercurrently contacted with a dilute (approximately 0.01 molar) solution of nitric acid. The dilute nitric acid strips out the neptunium, plutonium, and uranium forming an aqueous extract containing these materials and leaving the organic solvent for treatment in solvent cleanup stage 20 and recirculation to extraction step 14.

The aqueous extract feed is introduced into plutonium valence adjustment step 22 into which is introduced a thermally destructable plutonium reductant such as aminoguanidine, ferrous ion, semicarbazide, ascorbic acid, or a hydroxylamine salt. Preferably this reductant is hydroxylamine nitrate, which is a thermally decomposable, fast acting agent which produces no solid residual material. The preferred reductant is introduced to make the solution approximately 0.02 molar in hydroxylamine nitrate. This reduces the higher valence state plutonium to a valance of 3[Pu (III)] and the higher valence neptunium to a valence of 4[Np (IV).

The thus reduced solution from step 22 is introduced into aqueous extract concentration step 24. In this step the aqueous extract phase is rapidly added to a boiling solution of strong nitric acid, and is concentrated by evaporation by a factor of about two. This renders ineffective the reductant introduced in step 22 and oxidizes and stabilizes the plutonium as an anionic hexanitrato complex containing Pu (IV). Simultaneously the neptunium present is oxidized substantially entirely to valences greater than 4[Np (>IV)], possibly a mixtureof Np (V) and Np (VI).

The stabilized solution thus produced is cooled to approximately 60° C. and is introduced into plutonium anion exchange step 26. Here the solution is contacted with a bed of an anion exchange resin of the strong base quaternary amine type, such as those available commercially under the trade names Permutit SK, Dowex-1, and the like. The plutonium [(Pu IV)] is preferentially extracted by the resin, and the neptunium [Np (>IV)] and uranium are substantially unaffected and pass through forming a first aqueous raffinate. Subsequently, the resin is scrubbed with strong nitric acid to remove uranium and fission product materials, and the resin bed containing the plutonium is then treated with dilute nitric acid as a first elution stream to produce a plutonium [Pu (IV)] product stream substantially free of uranium, neptunium, and fission products.

The first raffinate containing Np (>IV) and uranium is then treated in neptunium valence adjustment step 28 with a second thermally destructable reductant, such as a mixture of ferrous ion and hydrazine, and in sufficient amount to reduce Np (>IV) to Np (IV). Simultaneously, trace amounts of plutonium not extracted in step 26 and which may be present in the first raffinate are reduced to Pu (III). The thus treated first raffinate is subsequently maintained at a temperature of about 60° C. to render the second reductant ineffective and stabilize the neptunium as Np (IV) and to reoxidize and stabilize traces of plutonium as Pu (IV). An alternate neptunium reductant would be semicarbazide.

In this condition and maintained at approximately the same temperature, the stabilized reduced first raffinate is introduced into neptunium anion exchange step 30 where it is contacted with a second bed of anion exchange resin of the same type referred to above in describing the plutonium anion exchange step 26. In step 30, the neptunium as Np (IV) is preferentially extracted by the resin while the uranium passes through substantially unaffected and is discharged as a second raffinate. The thus treated resin is subsequently scrubbed with strong nitric acid containing ferrous ion and hydrazine to remove uranium, plutonium, and fission product materials. Following this the scrubbed resin is treated with a second elution stream comprising dilute nitric acid thereby displacing the Np (IV) as a product solution substantially free of plutonium, uranium, and fission products.

The second raffinate is then introduced into dehydration zone 32 where it is heated to remove water and residual acid and to produce an anhydrous solid material containing the uranium as uranium trioxide ($UO_3$). The recovered acids are recirculated for reuse in the process. The anhydrous solids are discharged from step 32 and are introduced into fluorination step 34. Here the $UO_3$ is directly fluorinated with elemental fluorine to convert the $UO_3$ to uranium hexafluoride. The fluorinated material is appropriately purified to remove other fluorides and produce the relatively low boiling (about 55° C.) uranium hexafluoride as a product.

Referring now to FIGURE 2, a schematic flow diagram is shown of that part of the process of this invention corresponding to steps 22, 24, 26, 28 and 30 in FIGURE 1. The description of FIGURE 2 will be conducted in the form of a specific example of the present invention applied to the reprocessing of irradiated $UO_2$ type power reactor fuel which has been irradiated to approximately 20,000 megawatt-days/ton of uranium (mwd./t. U), which has been mechanically disassembled and treated with strong nitric acid at boiling temperatures to dissolve the $UO_2$ fuel material forming a nitric acid solution, and from which the plutonium, neptunium, and uranium have been separated from the bulk of the fission products by solvent extraction with an organic solvent, followed by solvent stripping to produce an aqueous extract corresponding to that produced from step 18 in FIGURE 1. The relative quantities of uranium, transuranic isotopes, and fission products present in the irradiated fuel referred to above and expressed as though in elemental form are approximately as follows:

Table 1.—Irradiated fuel composition

|  | Kg. |
|---|---|
| U | 1,000 |
| Pu | 6.9 |
| Np | 0.35 |
| Fission products | 12 |

EXAMPLE

In the flow diagram of FIGURE 2, the principal equipment items illustrated are the aqueous extract feed concentrator 40 provided with steam stripper 42 and reboiler 44; cooler 46; plutonium anion exchanger 48 provided with isolation valves 50, 52, and 54 dividing the exchanger into plutonium extraction zone 56, scrubbing zone 58, and plutonium elution zone 60; and neptunium anion exchanger 64 provided with isolation valves 66, 68, and 70 dividing the exchanger into neptunium extraction zone 72, scrubbing zone 74, and neptunium elution zone 76.

The aqueous extract feed stream (produced by stripping the organic extract in step 18 of FIGURE 1), has the following composition, the materials noted being present in the stream as water soluble nitrate salts with their concentrations expressed as though they were in elemental form:

Table 2.—Aqueous extract feed

| U | grams/liter | 90 |
|---|---|---|
| $HNO_3$ | molar | 0.2 |
| Pu (IV), (VI) | grams/liter | 0.6 |
| Np (IV), (V), (VI) | do | 0.03 |

The aqueous extract feed at a temperature of about 45° C. is introduced through line 80 and valve 82 into admixture with a sufficient quantity of hydroxylamine nitrate as plutonium reductant, introduced through line 84 controlled by valve 86, to raise the reductant concentration in the aqueous extract to about 0.02 molar. This liquid mixture flows through line 88 into the top of steam stripper 42 where it passes downwardly countercurrent to rising stream of water vapor and nitric acid vapor volatilized in reboiler 44. Overhead vapors are condensed in condenser 90 and returned in part through line 92 and valve 94 as reflux to stripper 42 and in part recycled through line 96 and valve 98.

During the passage of the aqueous extract-plutonium reductant mixture through line 88 and downwardly through steam stripper 42, the plutonium reduction to Pu (III) and the neptunium reduction to Np (IV) are completed, reactions which under these conditions require a time which may range from about 3 to about 10 minutes and an acid concentration not exceeding about 2 molar. This reduction could be accomplished in any suitable reaction equipment, and in any event must be allowed to proceed to completion prior to introduction of the aqueous extract-plutonium reductant mixture rapidly into the high acidity concentrator bottoms stream recirculated in reboiler 44.

Recirculating through reboiler 44 and lines 100, 102, and 104, together with highly acidic plutonium and neptunium scrub effluents recycled through line 108, is the concentrator bottoms stream maintained at a boiling temperature, in this example approximately 110° C., and having approximately the following composition:

Table 3.—Concentrator bottoms

| U | grams/liter | 180 |
|---|---|---|
| $HNO_3$ | molar | 7 |
| Pu (IV) | grams/liter | 1.2 |
| Np (>IV) | do | 0.06 |

As the aqueous extract-plutonium reductant mixture passes downwardly from steam stripper 42 and is rapidly mixed with the boiling 7 molar nitric acid concentrator bottoms stream, the reductant is destroyed, the 7 molar nitric acid oxidizes the neptunium present to Np (>IV) and oxidizes and stabilizes the plutonium as Pu (IV). The thus stabilized concentrate is removed through line 110 and valve 112 is cooled to about 60° C. in cooler 46. In this condition, the concentrate is in condition for separation of plutonium from the neptunium and uranium in plutonium anion exchanger 48. The nitric acid concentration maintained in reboiler 44 is of critical importance to the successful adjustment of the plutonium and neptunium valences. For this purpose the acidity of the reboiler concentrator bottoms stream must be sufficient to form the hexanitrato plutonium complexes, namely at least about 4 molar in nitric acid, and preferably about 7 molar.

Both anion exchangers 48 and 64 shown in FIGURE 2 are commercially available semi-continuous movable bed anion exchange resin contact equipment, although stationary resin bed equipment could also be used. This equipment will not be described further in detail except to note that in operation the various fluid streams flow through the individual contact zones (56, 58, and 60; 72, 74, and 76) while the isolation valves (50, 52, and 54; 66, 68, and 70) are closed and the resin bed is stationary, that by means not shown the resin bed may be moved a predetermined amount periodically in a counterclockwise direction (as the equipment is illustrated in FIGURE 2) while the fluid flows are terminated and the isolation valves are open, and that following closure of the isolation valves the fluid flows are resumed thus providing a semi-continuous extraction, scrubbing, and elution system.

The concentrator bottoms stream, having the composition given in Table 3 is introduced through line 100 and passed through plutonium extraction zone 56 of anion exchanger 48. Plutonium is extracted by the resin substantially quantitatively forming a first raffinate which is discharged through line 113 and valve 114 and is sent as feed to the neptunium anion exchanger 64. This stream has the following composition:

Table 4.—First raffinate

| | |
|---|---|
| U _____grams/liter__ | 165 |
| $HNO_3$ _____molar__ | 6.5 |
| Pu _____ | Trace |
| Np (>IV) _____grams/liter__ | 0.06 |

The resin present in scrubbing zone 58, previously loaded with plutonium on passage through extraction zone 56, is scrubbed with 6 molar nitric acid at a temperature of 60° C. and introduced through line 116 and valve 118 to remove trace amounts of uranium and fission products acquired in extraction zone 56. The resulting plutonium scrub effluent is removed from scrubbing zone 58 through line 120 and valve 122 and returned through line 108 for retreatment in reboiler 44.

The resin present in plutonium elution zone 60, substantially free of contaminants, is contacted with 0.6 molar nitric acid as a first elution stream at a temperature of about 60° C. introduced through line 124 and valve 126. This elutes the plutonium from the resin and produces through line 128 and valve 130 an aqueous elution effluent which is the plutonium product solution having the following composition:

Table 5.—Plutonium product solution

| | |
|---|---|
| Pu _____grams/liter__ | 15 |
| $HNO_3$ _____molar__ | 4.5 |

This stream may be further treated in a concentrator not shown, equipment resembling reboiler 44, to produce an aqueous plutonium nitrate solution of approximately 250 grams/liter concentration.

The first raffinate solution produced from plutonium extraction zone 56 and having the composition given in Table 4 and at a temperature of about 60° C. is combined in line 113 with a neptunium reductant introduced at about 20° C. through line 132 and valve 134. The reductant has the following composition:

Table 6.—Neptunium reductant

| | Molar |
|---|---|
| Ferrous ion _____ | 1 |
| Hydrazine nitrate _____ | 2 |
| $HNO_3$ _____ | 1 |

The amount of neptunium reductant so added is controlled to reduce all Np (>IV) to Np (IV), which may be done by maintaining a reductant concentration of approximately 0.02 molar in the mixture. This also reduces any plutonium present to Pu (III), but at the operating temperature of 60° C. the reductanct is ultimately destroyed after which the plutonium reoxidizes to Pu (IV) in the solution. However, the neptunium remains as Np (IV). The thus treated first raffinate is then introduced as feed through line 113 to neptunium anion exchanger 64.

This exchanger is essentially identical in structure and operation to the plutonium anion exchanger described above. The second raffinate discharges from neptunium extraction zone 72 through line 136 and valve 138, being an aqueous nitric acid solution of uranyl nitrate having approximately the following composition:

Table 7.—Uranium product solution (second raffinate)

| | |
|---|---|
| U _____grams/liter__ | 160 |
| $HNO_3$ _____molar__ | 6.3 |
| Ferric ion _____do____ | 0.02 |

This stream may be further treated in a concentrator not shown, equipment resembling reboiler 44, to produce an aqueous uranyl nitrate solution of approximately 1000 grams/liter concentration.

A nitric acid scrub solution at about 60° C. and having approximately the following composition is introduced into scrubbing zone 74 through line 140 and valve 142:

Table 8.—Neptunium scrub

| | Molar |
|---|---|
| Ferrous ion _____ | 0.02 |
| Hydrazine _____ | 0.04 |
| $HNO_3$ _____ | 6 | and produces through line 144 and valve 146 a neptunium scrub effluent which is returned through line 108 to reboiler 44.

The thus loaded and scrubbed resin in elution zone 76 is contacted at a temperature of about 60° C. and 0.6 molar nitric acid as an elution stream introduced through line 148 and valve 150 and produces through line 152 and valve 154, the neptunium product solution having the following approximate solution:

Table 9.—Neptunium product solution

| | |
|---|---|
| Np _____grams/liter__ | 1.2 |
| $HNO_3$ _____molar__ | 3 |

This product solution may be further treated in a concentrator not shown, equiment resembling reboiler 44, to produce an aqueous neptunium nitrate solution of approximately 40 grams/liter.

A particular embodiment of this invention has been described in considerable detail by way of illustration. It should be understood that various other modifications and adaptations thereof may be made by those skilled in that particular art without departing from the spirit and scope of this invention as defined in the following claims.

I claim:
1. A method of recovering neptunium from an aqueous solution comprising uranium, neptunium and plutonium which comprises reducing the plutonium to the Pu (III) valence state at acid concentrations below about 2 molar, oxidizing and stabilizing the plutonium in the Pu (IV) state and oxidizing the neptunium to the Np (>IV) state by rapidly increasing the acid concentration to above about 4 molar, contacting the thus stabilized aqueous solution with an anion exchange resin to extract the Pu (IV) plutonium and produce a raffinate solution containing the unextracted Np (>IV) neptunium, eluting the plutonium from said anion exchange resin, and recovering the neptunium from said raffinate.

2. A method according to claim 1 wherein the plutonium reduction to Pu (III) is effected by adding to said aqueous solution a thermally destructable reductant.

3. A method according to claim 2 wherein said reductant is hydroxylamine nitrate.

4. A method according to claim 2 wherein the oxidation and stabilization of the plutonium in the Pu (IV) valence state and the oxidation of the neptunium to the Np (>IV) valence state are accomplished by rapidly introducing the mixture of said aqueous solution and said thermally destructable reductant into approximately 7 molar boiling nitric acid.

5. A method according to claim 1 wherein the recovery of neptunium from said raffinate is effected by reducing the neptunium to the Np (IV) valence state, contacting the thus reduced raffinate with a second anion exchange resin to extract the Np (IV) neptunium and produce a second raffinate solution substantially free of plutonium and neptunium, and eluting the extracted neptunium from said second anion exchange resin.

6. A method according to claim 5 wherein the neptunium reduction is effected by adding to said first raffinate a thermally destructable reductant.

7. A method according to claim 6 wherein said thermally destructable reductant is a nitric acid solution of ferrous ion and hydrazine.

8. A method according to claim 5 wherein said second raffinate solution contains uranium and trace amounts of fission products, in combination with the steps of dehydrating said second raffinate to produce a mixture of uranium oxide and trace amounts of fission product oxides, directly fluorinating said mixture of oxides with elemental fluorine, and separating uranium hexafluoride from the fission product fluorides.

References Cited

UNITED STATES PATENTS 3,222,124  12/1965  Anderson et al. _____ 23—338

FOREIGN PATENTS 551,873  1/1958  Canada.

OTHER REFERENCES

Poe et al.: Industrial & Engineering Chemistry, Process Design and Development, $Np^{237}$ and $Pu^{238}$ separation at the Savannah River Plant, pp. 314–22, October 1964.

G. A. Burney: Ion Exchange Process for the Recovery of $Pu^{238}$ from Irradiated $Np^{237}$, October 1964, pp. 328–32.

CARL D. QUARFORTH, *Primary Examiner.*

M. J. McGREAL, *Assistant Examiner.*

U.S. Cl. X.R.

23—337, 339, 341, 343